US012600135B2

(12) United States Patent
Song et al.

(10) Patent No.: US 12,600,135 B2
(45) Date of Patent: Apr. 14, 2026

(54) POLYMER BASED CONDUCTIVE PATHS FOR FLUIDIC DIES

(71) Applicant: Hewlett-Packard Development Company, L.P., Spring, TX (US)

(72) Inventors: Bo Song, Corvallis, OR (US); Jacob Sterle, Corvallis, OR (US); Tsuyoshi Yamashita, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 102 days.

(21) Appl. No.: 18/726,681

(22) PCT Filed: Jan. 21, 2022

(86) PCT No.: PCT/US2022/013230
§ 371 (c)(1),
(2) Date: Jul. 3, 2024

(87) PCT Pub. No.: WO2023/140856
PCT Pub. Date: Jul. 27, 2023

(65) Prior Publication Data
US 2025/0091348 A1 Mar. 20, 2025

(51) Int. Cl.
*B41J 2/16* (2006.01)
*B41J 2/14* (2006.01)

(52) U.S. Cl.
CPC ......... *B41J 2/1637* (2013.01); *B41J 2/14072* (2013.01); *B41J 2/1601* (2013.01); *B41J 2/1623* (2013.01); *B41J 2/1631* (2013.01); *B41J 2/1635* (2013.01)

(58) Field of Classification Search
CPC ...... B41J 2/1623; B41J 2/1637; B41J 2/1601; B41J 2/1635; B41J 2/1626; B41J 2/14072; B41J 2202/20; B41J 2/1631; B41J 2/14201; B41J 2/14209; B41J 2/14233; B41J 2/14274; B41J 2/14282; B41J 2/1429; B41J 2/14298; B41J 2002/14217; B41J 2002/14225; B41J 2002/14241; B41J 2002/1425; B41J 2002/14266; B41J 2002/14306
See application file for complete search history.

(56) References Cited

U.S. PATENT DOCUMENTS 11,214,064 B2 * 1/2022 Coventry ............. B41J 2/14129
2020/0031126 A1 1/2020 Chen et al.
2020/0094475 A1 3/2020 Chen et al.
2020/0238699 A1 * 7/2020 Choy .................. B41J 2/14145
2021/0331475 A1 10/2021 Coventry et al.

FOREIGN PATENT DOCUMENTS

JP WO2017078661 * 5/2017 ............ B41J 2/1632
WO 2014/133600 A1 9/2014

* cited by examiner

*Primary Examiner* — Kristal Feggins
(74) *Attorney, Agent, or Firm* — Foley & Lardner LLP

(57) ABSTRACT

In example implementations, a fluidic die is provided. The fluidic die includes a silicon sliver with a plurality of nozzles to eject a printing fluid. A conductive path is deposited along a length of the silicon sliver on opposite sides of the silicon sliver. The conductive path and a portion of the silicon sliver are encapsulated by an epoxy molding compound.

11 Claims, 6 Drawing Sheets

POLYMER BASED CONDUCTIVE PATHS FOR FLUIDIC DIES

CROSS-REFERENCE TO RELATED APPLICATIONS

This application is a US National Stage Entry under 35 U.S.C. § 371 of International Application No.: PCT/US2022/013230 filed Jan. 21, 2022, which is hereby incorporated by reference in its entirety.

BACKGROUND

Printing devices use fluid ejection devices to dispense printing fluids onto substrates. The fluid ejection devices can be electrically controlled to eject desired amounts of printing fluid onto desired locations of the substrate to print images or text. A typical fluid ejection device includes a fluidic die that is placed on a headland unit to form a printhead. The printhead may then be attached to a body or reservoir of printing fluid of the fluid ejection device.

The fluidic die may include silicon slivers where openings are formed, which allow the printing fluid to be ejected through the openings. The silicon slivers may include bond pads which can be electrically connected to the electrical portion of the printhead. Electrical connections can be formed on the silicon slivers to an electrical circuit of the printhead to provide electrical control of dispensing the printing fluid through the openings in the silicon slivers.

DETAILED DESCRIPTION

Examples described herein provide polymer based conductive paths for fluidic dies to dissipate electrostatic discharges (ESD) away from the electrically sensitive components of the fluidic die. As discussed above, a fluid ejection device may include a fluidic die that comprises a silicon device that can be encapsulated. Past devices have achieved encapsulation of the silicon device by a fan-out panel level packaging scheme using an epoxy molding compound to enable in-situ formation of fluidic channels and reduce costs.

However, epoxy molding compound (EMC) has a high electrical resistivity that can block the ground pathways for electrostatic discharge (ESD) strikes. As a result, the undissipated ESD strikes can pass through nozzle plate regions in the fluidic dies, create fluidic ingress points and corroding the electrical circuits of the silicon device. The ESD failures can also be accelerated by high power and high voltage signals and lead to cascading resistor failures.

Previous solutions aimed to contain the effect of ESD strikes though circuits designed to divert the ESD strikes to a location that will not cause a catastrophic failure. Methods included adding a shielding layer over the sensitive devices, increasing the circuit distance to sensitive devices to delay the propagation of corrosion, or isolating the sensitive devices from high voltage lines that corrode more quickly. However, these solutions do not provide a complete solution, are costly, and can degrade other performance of the fluidic ejection device.

The present disclosure provides a polymer based conductive path in contact with the silicon slivers that can be used to prevent ESD strikes from dissipating towards the fluidic die, and, thus, prevent cascading failures. In an example, the polymer based conductive path may comprise a polymer based conductive adhesive or a conductive polymer. The polymer based conductive adhesive or conductive polymer can be applied during fabrication of the fluidic die using a variety of methods described herein.

The polymer based conductive adhesive can provide a wide range electrical resistivities by tuning filler types, sizes, concentrations, and form factors. The polymer based conductive adhesive provides strong adhesion to the silicon slivers and can be cured at room temperature. The conductive polymer can also provide a wide range of electrical resistivities depending on a doping level. The conductive polymer can be photo-patternable using existing photolithography techniques or can be 3D printed onto the substrate when forming the fluidic dies.

Figure 1:
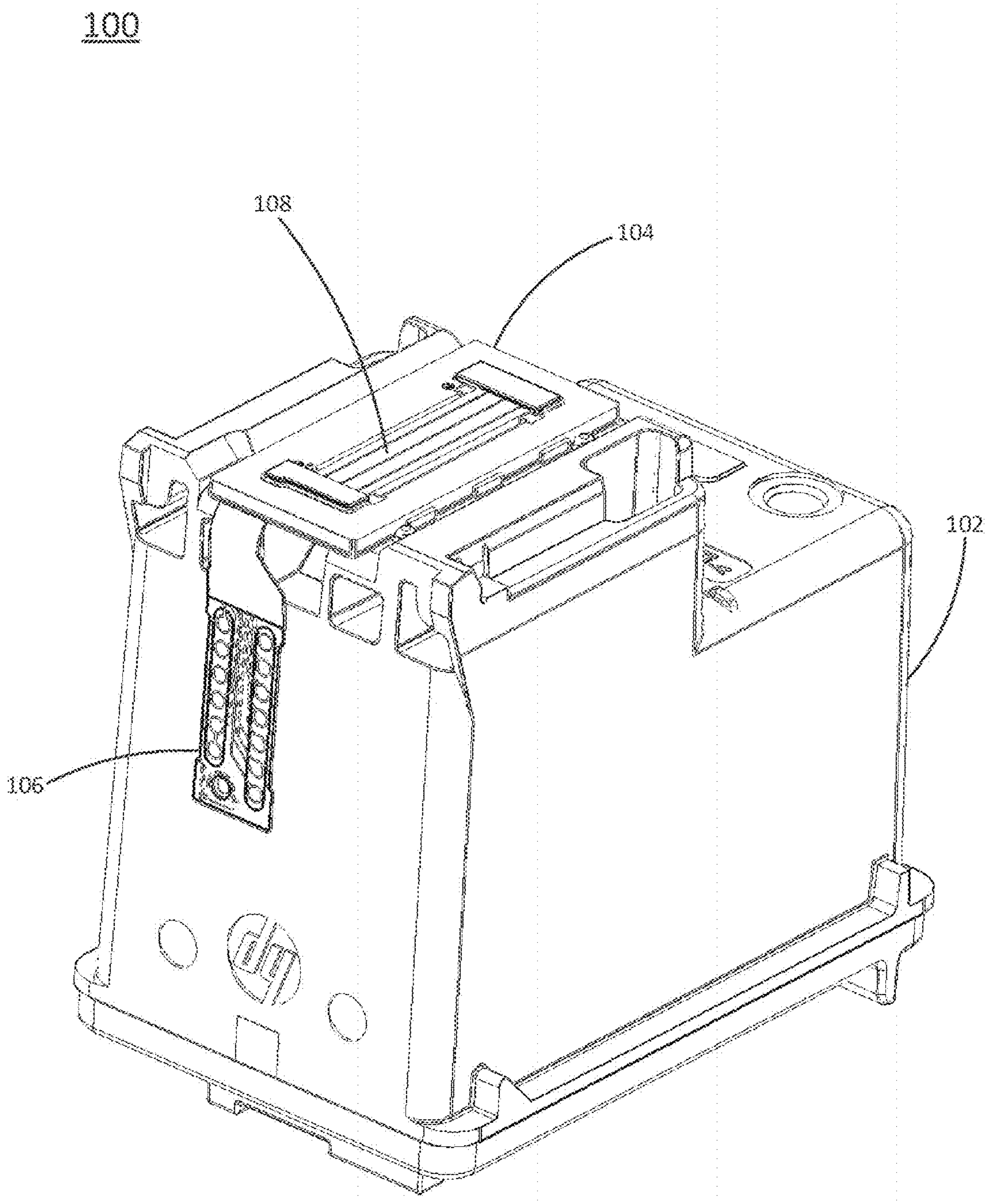
FIG. 1 is a representative image of an example fluidic ejection device that includes a fluidic die with polymer based conductive paths of the present disclosure.

FIG. 1 illustrates an example fluid ejection device 100 that includes a fluidic die 108 that includes polymer based conductive paths of the present disclosure. The fluid ejection device 100 may be inserted into a printing or imaging device (not shown) to print images onto a substrate. The printing device may be an inkjet printer.

The fluid ejection device 100 may be electrically controlled by a processor of the printing device to eject printing fluid through nozzles located on the fluidic die 108. The processor may control the fluid ejection device 100 to dispense a desired amount of printing fluid onto desired locations of a substrate to print the image.

The fluid ejection device 100 may include reservoirs of a printing fluid, such as ink, inside of a reservoir body 102 of the fluidic ejection device 100. The reservoir body 102 may store printing fluid. For example, the reservoir body 102 may include several different reservoirs that can store different colored printing fluids (e.g., cyan, yellow, magenta, and black) for a color printing device. In another example, the reservoir body 102 may include a single reservoir to store a single color printing fluid (e.g., black) for a black and white printing device.

In an example, a printhead 104 may be coupled to the reservoir body 102 of the fluid ejection device 100. The printhead 104 may also be referred to as an integrated headland unit that includes electrical pads 106. The electrical pads 106 may establish electrical connections to corresponding electrical pads on a movable carriage of the printing device. The processor of the printing device may transmit electrical signals to the fluidic die 108 via the electrical pads 106 to control ejection of the printing fluid. For example, the electrical signals may control ejection of printing fluid through the nozzles in the fluidic die 108 or localized heating of printing fluid to eject printing fluid (e.g., in the case of a thermal inkjet (TIJ) resistor device).

Figure 2:
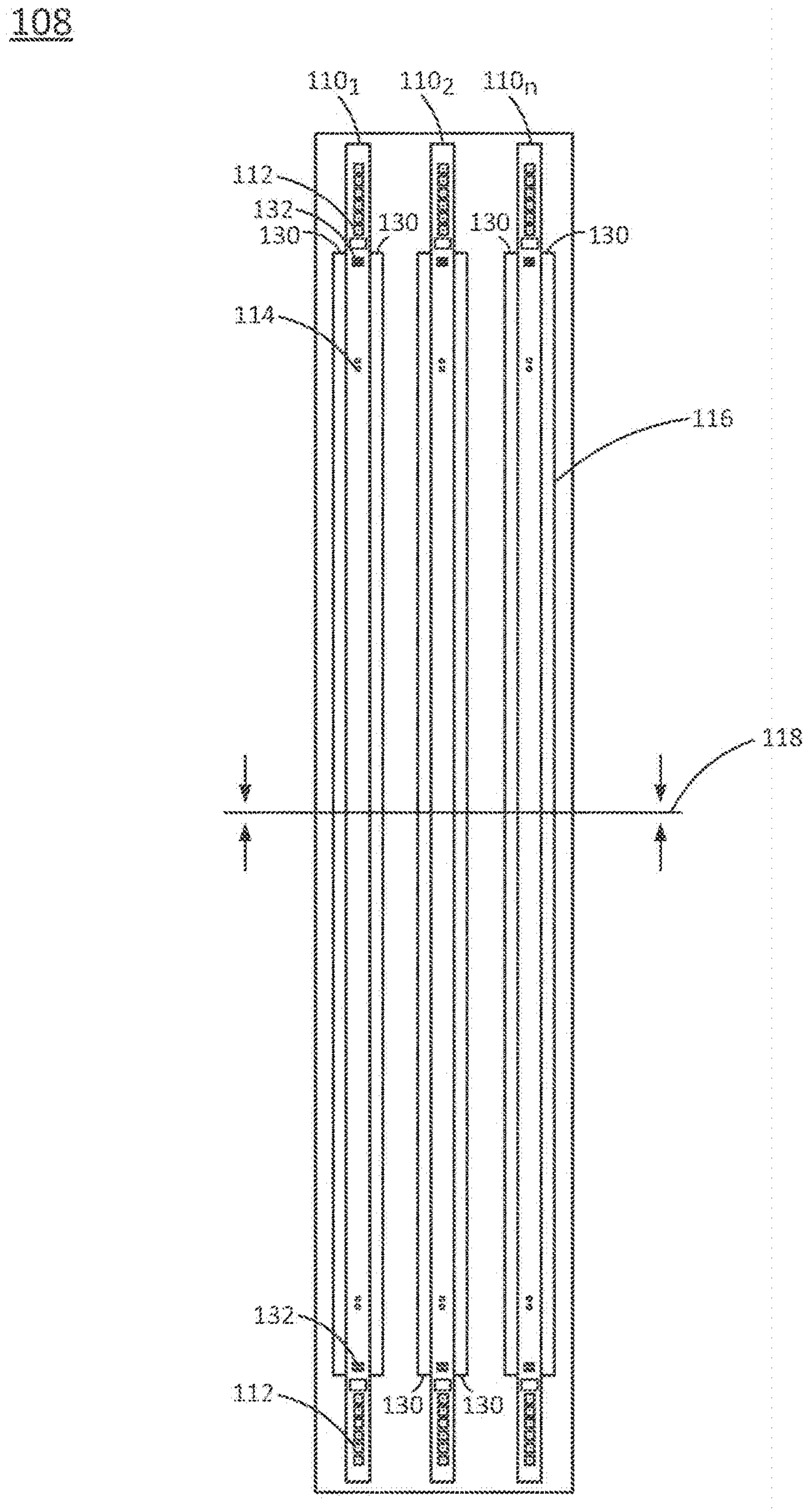
FIG. 2 is a top view of an example fluidic die with polymer based conductive paths of the present disclosure.

FIG. 2 illustrates a more detailed top view of the fluidic die 108 of the present disclosure. The fluidic die 108 may include silicon slivers $\mathbf{110}_1$ to $\mathbf{110}_n$ (hereinafter also referred to individually as a silicon sliver 110 or collectively as silicon slivers 110). Although three silicon slivers 110 are illustrated in FIG. 2, it should be noted that any number of silicon slivers 110 may be deployed on fluidic die 108.

The silicon slivers may be over molded with an epoxy molding compound (EMC) 116. In an example, each one of the silicon slivers 110 may include at least one nozzle 114 to eject printing fluid. Each one of the silicon slivers 110 may also include bond pads 112 to establish an electrical connection and to allow the nozzles 114 to be electrically controlled.

For example, the ejection of the printing fluid may be controlled via a TIJ resistor. An electrical signal may be sent to the TIJ resistor to heat the resistor. The TIJ resistor may generate localized heat to cause bubbles in the printing fluid. The force of the bubbles can cause small volumes of the printing fluid to be ejected via the nozzles 114.

Each one of the silicon slivers 110 may also include a polymer based conductive path 130. The polymer based conductive path 130 may be located on opposite sides of each silicon sliver 110. The polymer based conductive paths 130 may be applied to be adjacent to, and to contact, each side of the silicon sliver 110 to provide a good conductive path for ESDs to travel away from the silicon sliver 110 and along the sides through the polymer based conductive paths 130.

In an example, the polymer based conductive paths 130 may be run along a length of the silicon slivers 110. Each silicon sliver 110 may include targets 132 on each end of the silicon sliver 110. The polymer based conductive path 130 may run along the length of the silicon sliver 110 between the two targets 132 on each silicon sliver 110.

Figure 3:
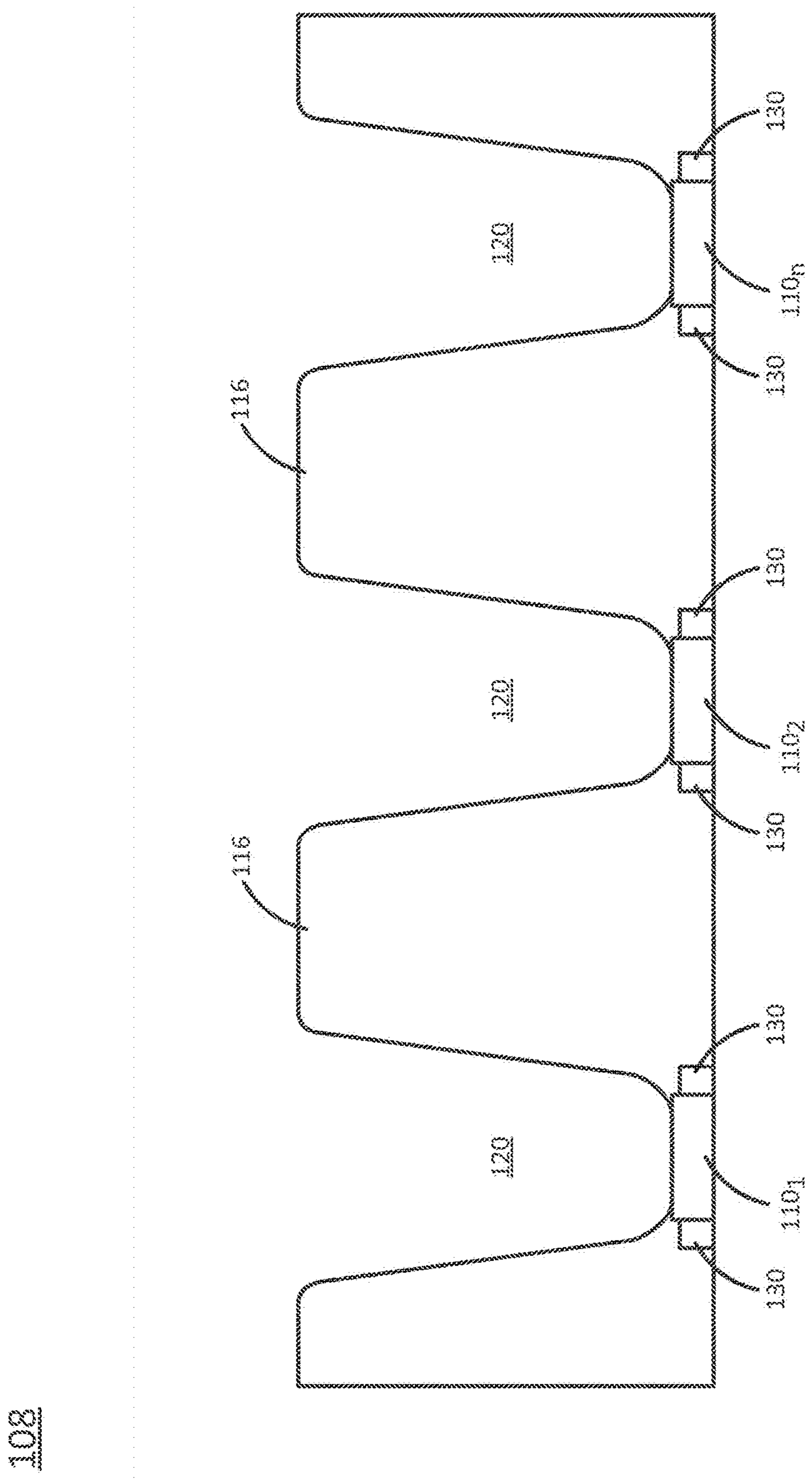
FIG. 3 is a cross-sectional view of the example fluidic die with polymer based conductive paths of the present disclosure.

FIG. 3 illustrates a cross-sectional view of the fluidic die 108 across line 118 illustrated in FIG. 2. In an example, the fluidic die 108 may be formed by over molding the EMC 116 over the silicon slivers 110 and the polymer based conductive paths 130. The EMC 116 can be molded to include open volumes or trenches 120. The printing fluid may be dispensed from the reservoirs in the reservoir body 102 of the fluid ejection device 100 towards the open volumes 120. The printing fluid may then flow towards the nozzles 114 of the silicon slivers 110.

The polymer based conductive paths 130 may be formed using various techniques, such as stencil printing, using a jet or needle adhesive printer, photolithography, and the like. Details of example molding processes are discussed in further detail below with respect to a method 400 that illustrates a semiconductor process flow illustrated in FIGS. 4-6 and in accordance with a method 700 illustrated in FIG. 7.

As discussed above, previous fluidic dies may not have designs that can effectively dissipate ESD strikes, which will cause damage to the fluidic dies. The ESDs may be generated from static electricity discharged from a user when the user touches the fluidic die when inserting the fluid ejection device 100 into a printing device. In another example, the ESDs may be generated from strikes from other silicon devices. In an automated manufacturing line, loading, unloading, and handling system on tools can also be another source of ESDs.

As noted above, the present disclosure provides polymer based conductive paths 130 to provide a pathway for the ESDs to travel away from electrically sensitive components in the silicon slivers 110 or fluidic die 108. The polymer based conductive paths 130 may be fabricated from a conductive adhesive or a conductive polymer.

Electrically conductive adhesives may include conductive fillers that are incorporated into polymer resins. The conductive fillers may include fillers such as carbon, silver, nickel, copper, and the like. The polymer resin may be similar to the epoxy resin used in the EMC 116. Example polymer resins may include multifunctional type epoxy resins, biphenyl type epoxy resins, di-cyclo pentadiene type epoxy resins, ortho cresol novolak type epoxy resins, multi-aromatic type epoxy resins, and the like.

In an example, the conductive adhesive may have an electrical resistivity between $10^{-4}$ to $10^{6}$ ohms per centimeter (Ω·cm). The electrical resistivity can be tuned to a desired resistivity value by selecting a particular type of conductive filler, particle size/diameter of the conductive filler, amount of the conductive filler (e.g., wt %), and form factor of the conductive filler. Example conductive adhesives may include Masterbond EP75-1 conductive graphite/epoxy system, conductive X graphite epoxy system, Henkel Loctte 2902, silver/epoxy system, and the like.

The conductive adhesive may offer high-level structural and ink soak durability. The conductive adhesive may provide strong adhesion to the silicon slivers 110 and the EMC 116. The conductive adhesive may provide good thermal stability as well, up to 250 degrees Celsius (° C.).

The conductive adhesive may also be processed efficiently and incorporated into the fabrication process of the fluidic die 108. For example, the conductive adhesive can be applied via an added step in the fabrication process of the fluidic die 108 using a stencil printer or automated jet or needle adhesive dispenser. In addition, the conductive adhesive can be cured at room temperature. As a result, minimal changes to the thermal history of the thermal release tape may be made. Large changes to the thermal history may cause premature release or different de-bond behaviors of the thermal release tape.

The conductive polymer may include polymers with redox doping that is analogous to doping of silicon semiconductors. The conductive polymer may also be tuned to have a range of resistivity between $10^{-2}$ to $10^{8}$ Ω·cm. The resistivity of the conductive polymer may be tuned by adjusting a doping level of the polymer. Examples of polymers that can be doped to be conductive include polythiophene, polyaniline, polypyrrole, poly(3,4-ethylenedioxythiophene) polystyrene sulfonate (PDOT/PSS), polyacetylene, and the like.

In an example, the conductive polymer may also be processed efficiently and incorporated into the fabrication process of the fluidic die 108. For example, the conductive polymer can be applied via an added step in the fabrication process of the fluidic die 108 using a photolithography techniques.

Figure 4:
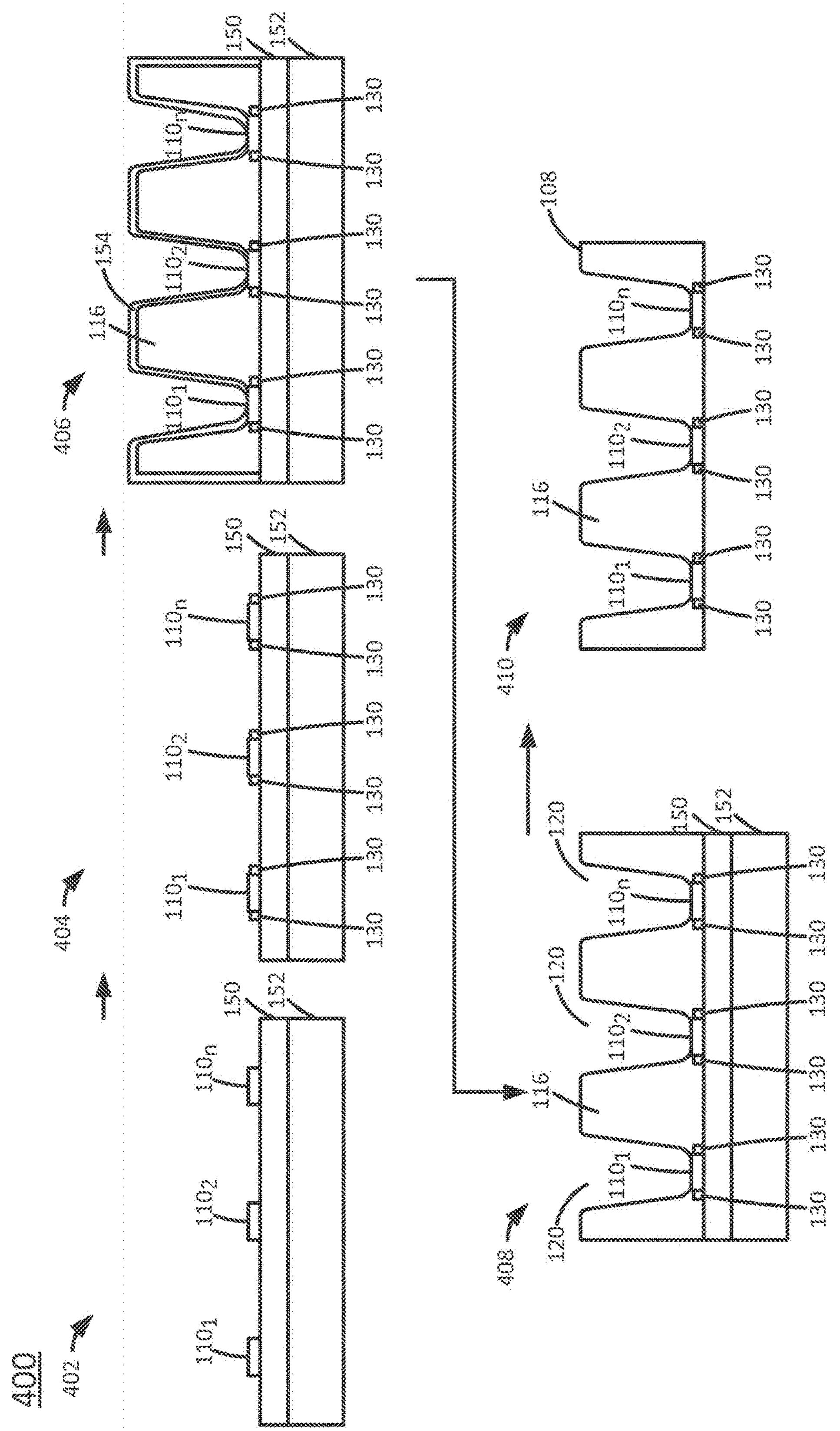
FIG. 4 is an example process flow of a method to prepare the fluidic dies with the polymer conductive paths of the present disclosure.

FIG. 4 illustrates a process flow diagram of an example method 400 for fabricating the fluidic die 108 with polymer based conductive paths 130 of the present disclosure. In an example, the method 400 may be performed by various tools and/or equipment controlled by a processor or a controller that oversees operation of the tools and/or equipment.

At 402, silicon slivers $\mathbf{110}_1$-$\mathbf{110}_n$ may be deposited onto a substrate. The substrate may include a copper carrier 152 and a thermal release tape 150. The silicon slivers $\mathbf{110}_1$-$\mathbf{110}_n$ may be deposited onto the thermal release tape 150 using a pick and place process.

At 404, the polymer based conductive paths 130 may be deposited onto the substrate. The polymer based conductive paths 130 may be deposited along each sidewall of the silicon slivers $\mathbf{110}_1$-$\mathbf{110}_n$. The polymer based conductive paths 130 may be deposited to ensure contact between the sidewalls of the silicon slivers $\mathbf{110}_1$-$\mathbf{110}_n$ and the polymer based conductive paths 130.

The polymer based conductive paths 130 may be deposited in 404 using a variety of techniques. For example, when the polymer based conductive paths 130 comprise a polymer based conductive adhesive described above, the conductive adhesive can be applied using a high accuracy stencil printer with optical alignment.

Figure 5:
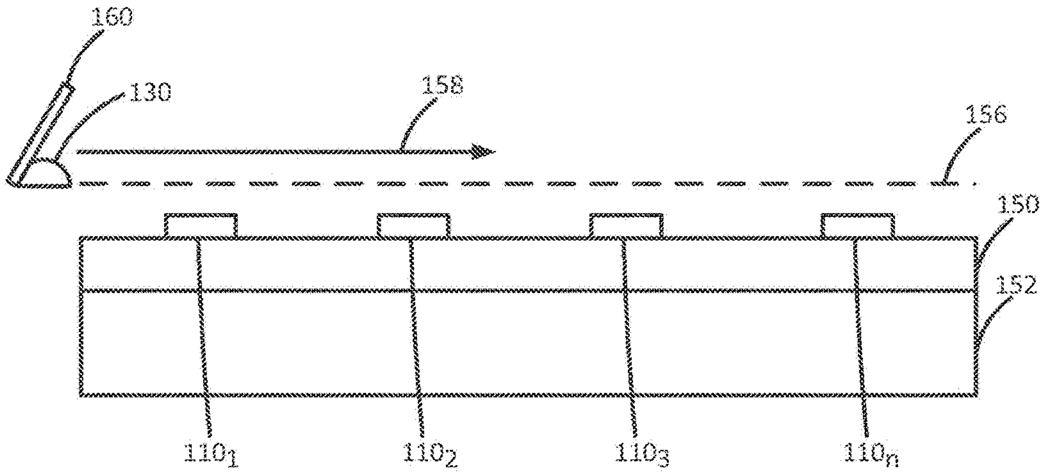
FIG. 5 is an example of stencil printer method for applying the polymer based conductive path of the present disclosure.

An example of applying the polymer based conductive path 130 with a stencil printer is illustrated in FIG. 5. For example, a stencil 156 may include a pattern of openings that correspond to where the polymer based conductive path 130 may be applied. A high accuracy optical alignment system may align the stencil 156 such that the openings in the stencil 156 are aligned adjacent to the silicon slivers 110.

After the stencil 156 is aligned, the conductive adhesive may be spread across the stencil 156, as shown by an arrow 158. A blade or edge of the stencil printer may move the conductive adhesive across the stencil 156, and the conductive adhesive may be deposited through the openings of the stencil 156. The conductive adhesive may be cured at room temperature before proceeding to block 406 in method 400.

Figure 6:
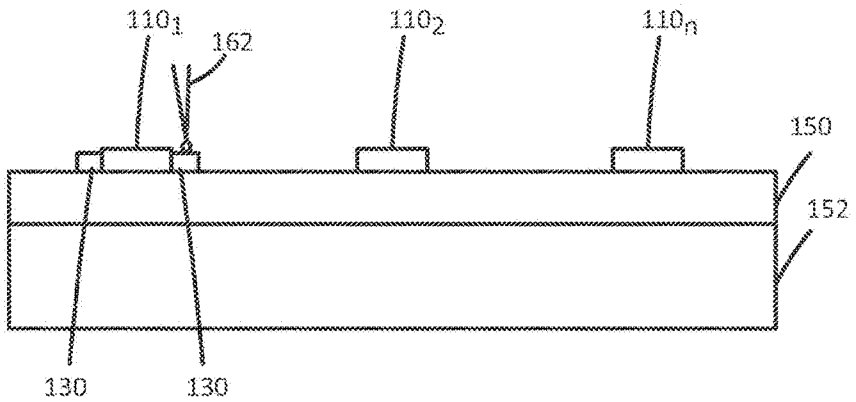
FIG. 6 is an example of an example needle or jet adhesive dispenser for applying the polymer based conductive path of the present disclosure.

FIG. 6 illustrates an example jet or needle adhesive dispenser that can be used to dispense the polymer based conductive path 130. For example, a high precision needle dispenser 162 may be controlled to dispense the conductive adhesive on desired locations (e.g., adjacent and in contact with the silicon slivers 110).

In an example, an image of the substrate with the silicon slivers 110 may be provided to the needle adhesive dispensing system. The desired locations that are to receive the conductive adhesive may be marked in the image. A controller or processor of the needle adhesive dispensing system may control the needle dispenser 162 to deposit the conduct adhesive in desired locations.

When the polymer based conductive path 130 is fabricated with a conductive polymer, a photolithography process may be used, as noted above. For example, the photolithography mask may be applied to the substrate, exposed, and etched to create a pattern where the conductive polymer may be applied or deposited. The conductive polymer may be deposited and the photolithography mask can be removed.

Referring back to FIG. 4, after the polymer based conductive paths 130 are formed, the method 400 may proceed to 406. At block 406, a transfer molding process may be performed to over mold the silicon slivers 110 and the polymer based conductive paths 130 with the EMC 116. For example, a mold insert 154 may be placed over the substrate and filled with the EMC 116. The mold may hold the EMC 116 in the desired amount and in the desired locations on the substrate.

At 408, the EMC 116 may be cured, and the mold insert 154 may be removed. The result may be the trenches 120 formed over the silicon slivers 110. As noted above, the printing fluid may be dispensed by a fluid ejection device 100 towards the trenches 120.

At 410, the substrate may be removed to finalize formation of the fluidic die 108. For example, the copper carrier 152 and the thermal release tape 150 may be removed.

Figure 7:
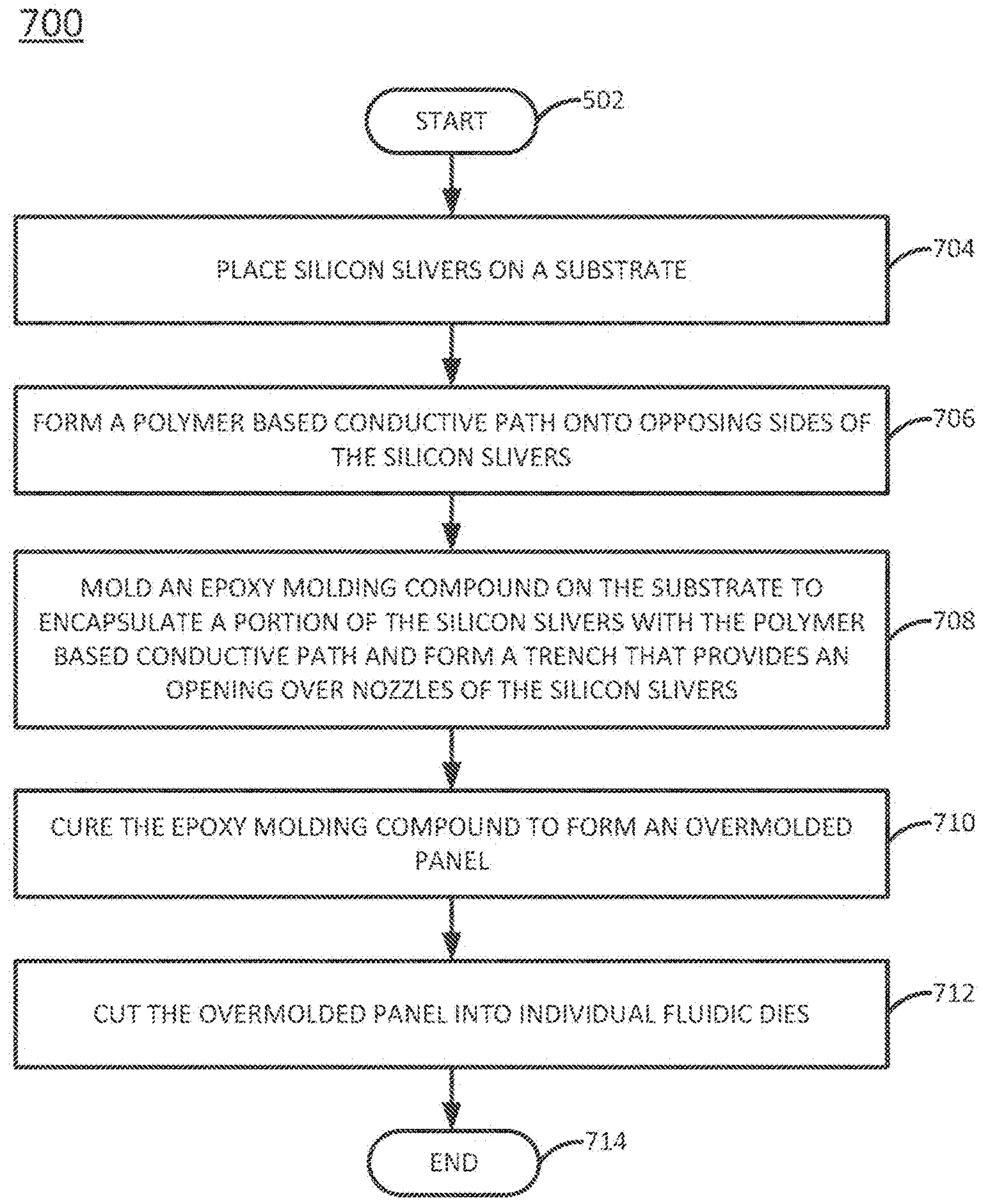
FIG. 7 is a flow chart of an example method to fabricate the fluidic die with the polymer based conductive paths of the present disclosure.

FIG. 7 illustrates a flow diagram of an example method 700 for fabricating the fluidic die 108 that includes the polymer based conductive paths 130 of the present disclosure. In an example, the method 700 may be performed by various tools and/or equipment controlled by a processor or a controller that oversees operation of the tools and/or equipment.

At block 702, the method 700 begins. At block 704, the method 700 includes placing silicon slivers on a substrate, such as described above in reference to 402 of FIG. 4. As noted above, the silicon slivers can be deposited onto the substrate using a pick and place process.

In an example, the substrate can comprise wafers up to 12 inches or panels up to 300 millimeters (mm) by 300 mm. The silicon slivers may include openings that form the nozzles to eject a printing fluid. The silicon slivers may also include bond pads for electrical connections to control components within the fluidic die (e.g., the TIJ resistors that control ejection of the printing fluid through the nozzles of the silicon slivers).

At block 706, the method 700 includes forming a polymer based conductive path onto opposing sides of the silicon slivers, such as described above in reference to 404 in FIG. 4 and FIGS. 5 and 6. The opposing sides may be the longer sides of the silicon slivers. For example, the polymer based conductive path may be formed along a length of the silicon slivers between opposing targets on the silicon slivers.

The polymer based conductive path may be formed to contact the sidewalls of the silicon slivers to form a good electrical interconnection between the silicon slivers and the polymer based conductive path. The polymer based conductive path may allow ESD strikes to dissipate away from the fluidic die and along an outer perimeter of the silicon sliver. The polymer based conductive path may prevent electrically sensitive components (e.g., resistors and circuit regions on the silicon sliver) from being damaged by ESD strikes.

In an example, the polymer based conductive path may be fabricated from a polymer based conductive adhesive or a conductive polymer, as described above. The polymer based conductive path may be formed using a variety of methods, such as stencil printing, using a needle or jet adhesive dispenser, photolithography processes, and the like.

At block 708, the method 700 includes molding an epoxy molding compound (EMC) on the substrate to encapsulate a portion of the silicon slivers with the polymer based conductive paths and form a trench that provides an opening over nozzles of the silicon slivers, such as described above in reference to 406 of FIG. 4. The EMC may be dispensed on the silicon substrate in locations between the silicon slivers using an over-molding process. For example, the transfer/slot molding process may use the EMC in a tablet form. A mold insert may be applied to the substrate populated with silicon dies in the desired pattern. The mold insert may define the shape of the EMC. The tablets of the EMC can be melted and dispensed to fill the openings between the substrate and the mold insert. In another implementation, the EMC may be formed and subsequently transferred in a transfer molding process by way of non-limiting example.

At block 710, the method 700 includes curing the epoxy molding compound to form an overmolded panel, such as discussed above in reference to 408 and 410 of FIG. 4. For example, the EMC can be cured by heat to solidify or harden the EMC. After curing, a carrier or tape may be de-bonded from the molded panel. However, it should be noted that the order of curing and de-bonding may be varied.

At block 712, the method 700 includes cutting the overmolded panel into individual fluidic dies. For example, the fluidic dies with the polymer based conductive channels may be cut into a smaller form factor with multiple fluidic dies or may be cut into a singulated form with individual fluidic dies. The fluidic dies may then be then inserted into a printhead or integrated headland unit. The printhead may then be inserted into a body of a fluidic ejection device. At block 714, the method 700 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A fluidic die, comprising:

a silicon sliver, wherein the silicon sliver comprises a plurality of nozzles to eject printing fluid;

a polymer based conductive path deposited along a length of the silicon sliver on opposite sides of the silicon sliver; and an epoxy molding compound to encapsulate the polymer based conductive path and a portion of the silicon sliver.

2. The fluidic die of claim 1, wherein the polymer based conductive path comprises a conductive adhesive.

3. The fluidic die of claim 2, wherein the conductive adhesive comprises a conductive filler incorporated into a polymer resin having a resistivity of $10^{-4}$ ohm centimeters (2·cm) to $10^{6}$ Ω·cm.

4. The fluidic die of claim 1, wherein the polymer based conductive path comprises a conductive polymer.

5. The fluidic die of claim 4, wherein the conductive polymer comprises a polymer that is doped to have a resistivity between $10^{-2}$ ohm centimeters (Ω·cm) to 108 Ω·cm.

6. The fluidic die of claim 5, wherein the polymer comprises at least one of: poly(3,4-ethylenedioxythiophene) polystyrene sulfonate (PDOT/PSS), polythiophene, polyaniline, polypyrrole, or polyacetylene.

7. A fluid ejection device, comprising:

a reservoir body to store a printing fluid; and a printhead coupled to the reservoir body, wherein the printhead comprises:

an electrical pad; and a fluidic die electrically connected to the electrical pad, wherein the fluidic die comprises polymer based conductive paths in contact with silicon slivers, wherein the conductive paths and the silicon slivers are encapsulated within an epoxy molding compound.

8. The fluid ejection device of claim 7, wherein the polymer based conductive paths are located on opposite sides of each silicon sliver of the silicon slivers.

9. The fluid ejection device of claim 7, wherein the polymer based conductive paths are located along a length of each silicon sliver of the silicon slivers to dissipate electrostatic discharges (ESDs) away from electrically sensitive components on the silicon slivers.

10. The fluid ejection device of claim 9, wherein the electrically sensitive components comprise nozzles on the silicon slivers.

11. The fluid ejection device of claim 7, wherein the polymer based conductive paths comprise a polymer based conductive adhesive or a conductive polymer.

* * * * *